(12) United States Patent  
McCarthy et al.

(10) Patent No.: US 7,681,462 B2
(45) Date of Patent: Mar. 23, 2010

(54) SYSTEM AND METHOD FOR MEASURING INTERACTION OF LOADS

(75) Inventors: Shaun David McCarthy, Sandymount (IE); Michael Andrew Daly, Delgany Wood (IE); Alan Simpson, Sandyford (IE); Ciaran Mythen, Swords (IE); Martin Flood, Fairview (IE); Guillaume Reux, Custom House Harbour (IE); David King, Drumcondra (IE)

(73) Assignee: Steorn Limited (IE)

( * ) Notice: Subject to any disclaimer, the term of this patent is extended or adjusted under 35 U.S.C. 154(b) by 322 days.

(21) Appl. No.: 11/503,766

(22) Filed: Aug. 14, 2006

(65) Prior Publication Data

US 2008/0034895 A1 Feb. 14, 2008

(51) Int. Cl.
*G01L 3/02* (2006.01)
(52) U.S. Cl. .................................. 73/862.191
(58) Field of Classification Search ............. 73/862.191
See application file for complete search history.

(56) References Cited

U.S. PATENT DOCUMENTS 2,234,384 A * 3/1941 Ryan ........................ 475/172
4,656,875 A * 4/1987 Uitermarkt ............. 73/862.045

(Continued)

FOREIGN PATENT DOCUMENTS

| EP | 0391756 A1 | 10/1990 |
| JP | 63200035 A | 8/1988 |
| WO | 9810260 A1 | 3/1998 |
| WO | 0216188 A1 | 2/2002 |
| WO | 2006071195 A1 | 7/2005 |

*Primary Examiner*—Lisa M Caputo
*Assistant Examiner*—Octavia Davis
(74) *Attorney, Agent, or Firm*—Seyfarth Shaw LLP; Brian L. Michaelis (57) ABSTRACT

A test system for measuring a rotary load comprises a stepper motor drives a gear box that is mounted at one end of a frame. A torque sensor provides a measurement signal transmission. The gear box's output shaft is connected to one of the torque sensor's stubs by means of a universal joint coupling. On the other side of the torque sensor a second universal joint coupling connects the sensor to a stainless steel shaft. A low friction flange bearing is used to provide support for the shaft. An angle encoder is disposed on the end of the shaft distal to the gear box. The gear box's output shaft, the torque sensor's cylindrical shaft hubs and associated couplings are arranged such that they are directly aligned with the shaft. The test system has been designed to take automated torque and angle readings from a shaft capable of rotary motion. The measurement arm configuration with the stepper motor directly connects the torque and angle sensors to a PC based data acquisition card for acquisition and processing of data. The system operates according to a method used to make a true torque measurement of a rotary actuated shaft or wheel in a process where a first data set is acquired with the system unloaded as the shaft or wheel is actuated through the defined travel path. The actuation force applied by the stepper motor is accurately controlled through a computer interface. Torque data is measured at each angular step as the wheel is actuated in a first direction. Torque data is then measured at each angular step as the wheel is actuated in the opposite direction. A load is then placed on the test system. With the load on the system, torque data is acquired/measured at each angular step through the defined travel path. Torque data is then measured at each angular step as the wheel is actuated in the opposite direction through the defined travel path. Ultimately, the true torque, i.e. torque less the effects of friction and the system baseline mechanical profile, is determined by adjusting measurement data to virtually eliminate these two effects.

5 Claims, 11 Drawing Sheets

U.S. PATENT DOCUMENTS 5,038,616 A * 8/1991 Schneider et al. ............. 73/660
5,255,566 A * 10/1993 Okumura ..................... 73/660
5,310,021 A * 5/1994 Hightower ............... 185/40 R
5,686,672 A * 11/1997 Klauber et al. ......... 73/862.191
6,745,621 B1 * 6/2004 Le Roux Cilliers
　　　　　　　　　　et al. ...................... 73/112.01

* cited by examiner

Overview

Determine True Torque for Load on System, 2 Measurement Arms

SYSTEM AND METHOD FOR MEASURING INTERACTION OF LOADS

FIELD OF THE INVENTION

The present invention relates to test systems, and more particularly to test systems for measuring characteristics of a load.

BACKGROUND OF THE INVENTION

It is often desirable to measure the forces associated with motion of a load, such as the motion of a fly-wheel or the linear or rotary motion of a rotary actuator. It is also desirable, in measuring such forces, to eliminate extraneous forces that might interfere with the true measurement of the force under measurement.

SUMMARY OF THE INVENTION

The present invention provides an apparatus and method for measuring a rotary load and provides the ability to substantially eliminate the affects of friction and system baseline characteristics from the load measurement.

According to the invention, a test system for measuring a rotary load comprises components mounted on an aluminum frame forming a measurement arm. In one embodiment, a stepper motor drives a gear box that is mounted at one end of the aluminum frame. Adjacent to the output shaft of the gear box is a torque sensor which provides contactless measurement signal transmission. The gear box's output shaft is connected to one of the torque sensor's stubs by means of a universal joint coupling. On the other side of the torque sensor a second universal joint coupling connects the sensor to a stainless steel shaft. A low friction flange bearing is used to provide support for the shaft. An angle encoder is disposed on the end of the shaft distal to the gear box. The gear box's output shaft, the torque sensor's cylindrical shaft hubs and associated couplings are arranged such that they are directly aligned with the shaft. The test system has been designed to take automated torque and angle readings from a shaft capable of rotary motion. The measurement arm configuration with the stepper motor directly connects the torque and angle sensors to a PC based data acquisition card for acquisition and processing of data.

In one embodiment of a method according to the invention the user of the system defines a travel path for the shaft or a wheel on the shaft and an angular step for that travel path. The system then automatically travels the path defined in a clockwise and counter-clockwise direction. Since the system has a certain settling time after movement a delay exists between the automated movement of an arm and the acquisition of data. This settling time has been configured to be 2 seconds. It should be appreciated that other settling times may be appropriate. Once the system has been allowed to settle, five torque measurements are taken with a 100 ms time period between them. The highest and lowest of these five samples are discarded and the average of the remaining three is taken and recorded as the torque at that angle. This multi-sampling approach is taken so that spikes caused by signal noise may be removed.

The system in the illustrative embodiment is used to make a true torque measurement of a rotary actuated shaft or wheel in a process where a first data set is acquired with the system unloaded as the shaft or wheel is actuated through the defined travel path. The actuation force applied by the stepper motor is accurately controlled through a computer interface. Torque data is measured at each angular step as the wheel is actuated in a first direction (e.g. clockwise). Torque data is then measured at each angular step as the wheel is actuated in the opposite direction (e.g. counter-clockwise).

A load is then placed on the test system, for example, a magnetic force applied by a fixed or electromagnet wherein it is desired to determine the torque on the wheel resulting from the application of the magnetic force or volume. With the load on the system, torque data is acquired/measured at each angular step as the wheel is actuated in a first direction (e.g. clockwise) through the defined travel path. Torque data is then measured at each angular step as the wheel is actuated in the opposite direction (e.g. counter-clockwise) through the defined travel path.

Ultimately, the true torque, i.e. torque less the effects of friction and the system baseline mechanical profile, is determined by adjusting measurement data to virtually eliminate these two effects. This is done so that the adjusted data represents the actual effects of the interaction of the load, e.g. magnetic field, and not changes in friction or the effect of the test system mechanical profile.

BRIEF DESCRIPTION OF THE DRAWINGS

FIG. 2 is a close-up view of one of the universal joint couplings used in the measurement arm for connection of the torque sensor to the shaft on one side and the gearbox or the other;

DETAILED DESCRIPTION

Figure 1:
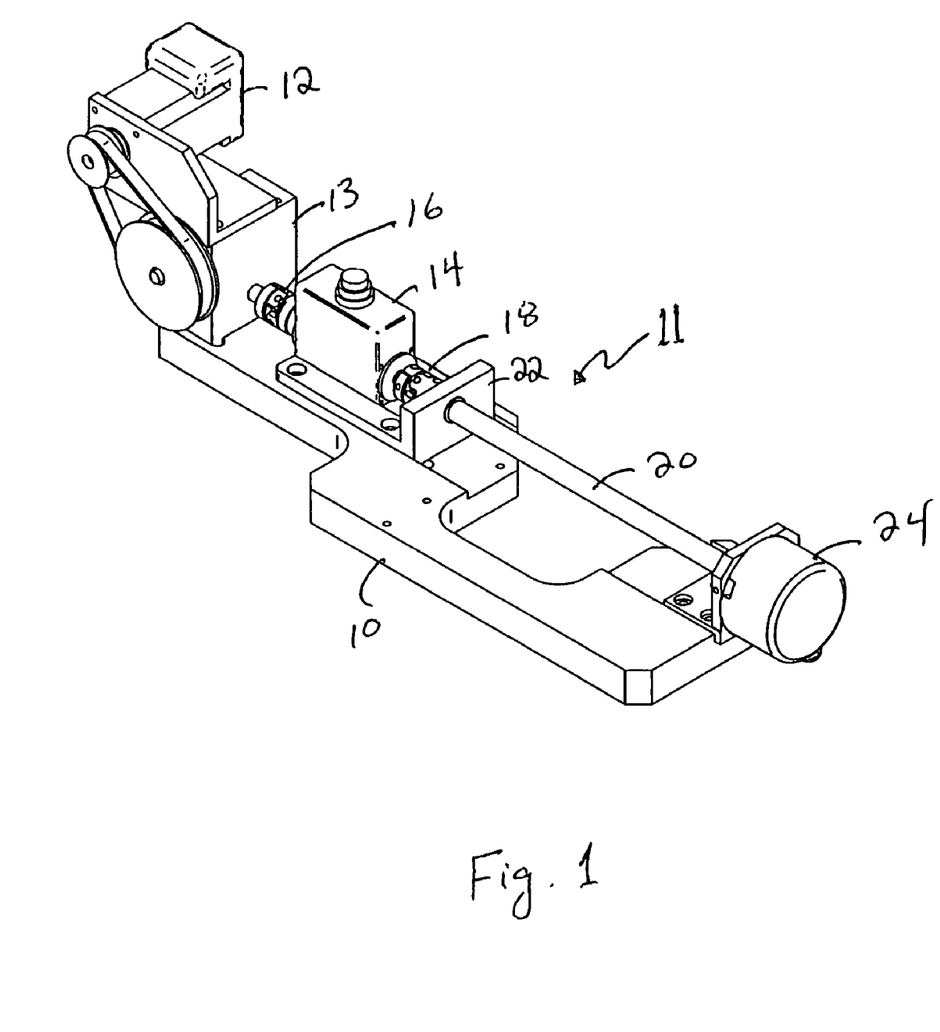
FIG. 1 is a perspective view of a test system for measuring a rotary load according to the invention.

The system, as illustrated in FIG. 1, is comprised of a number of components which are mounted on an aluminum frame 10 to form a measurement arm 11. A stepper motor 12, such as a MDrive model MDIF1719, drives a gear box 13, for example a Muffett model M3-50/1-C mounted at one end of the aluminum frame 10. Adjacent to the output shaft of the gear box is a torque sensor 14 with cylindrical shaft stubs. In this illustrative embodiment a HBM T20WN unit which provides contactless measurement signal transmission is implemented. The gear box's output shaft is connected to one of the torque sensor's stubs by means of a universal joint coupling 16. On the other side of the torque sensor a second universal joint coupling 18 is employed to connect the sensor to a stainless steel shaft 20. In this illustrative embodiment the universal joint couplings 16 and 18 are Yuil SCJA-20C couplings and the shaft 20 is of diameter 10 mm and length 255 mm. A low friction flange bearing 22 is used at this juncture to provide support for the shaft. An angle encoder 24 is disposed on the end of the shaft distal to the motor 12. In this embodiment, the angle encoder is a Wachendorff Encoder model WDG58E with angular contact bearings which provide axial and radial alignment with the shaft. The stepper motor's output shaft, the torque sensor's cylindrical shaft hubs and associated couplings are arranged such that they are directly aligned with the shaft.

The universal joint couplings 16, 18 are used to prevent the transmission of complex forces (such as bending forces) to the torque sensor 14. However, while they are highly effective at removing such forces, the universal joint couplings themselves typically contain a degree of play, or slop, as they turn. This characteristic of the couplings has the potential to cause erroneous readings being taken by the torque sensor 14. In order to substantially eliminate this, the universal joint couplings 16, 18 are kept under compression, thus removing the slop in the couplings. This is achieved by pressing the two sides of the coupling together before they are tightened onto the shaft. A consequence of this is that it increases the friction component of the measurement arm, hence the importance of adjusting for friction as described hereinafter. A more detailed depiction of the universal joint couplings 18 and low friction flange bearing 22 is illustrated in FIG. 2.

In the illustrative embodiment, the test system has been designed to take automated torque and angle readings from the shaft 20 or a wheel on the shaft (not shown) capable of rotary motion. The system is essentially configured as a single measurement arm 11 with the stepper motor 12 and direct connection of the torque and angle sensors to a PC based data acquisition card as known in the art (not shown in FIG. 1). It should be appreciated that more than one measurement arm can be configured according to the invention, as described hereinafter with respect to a two measurement arm implementation.

Figure 3:
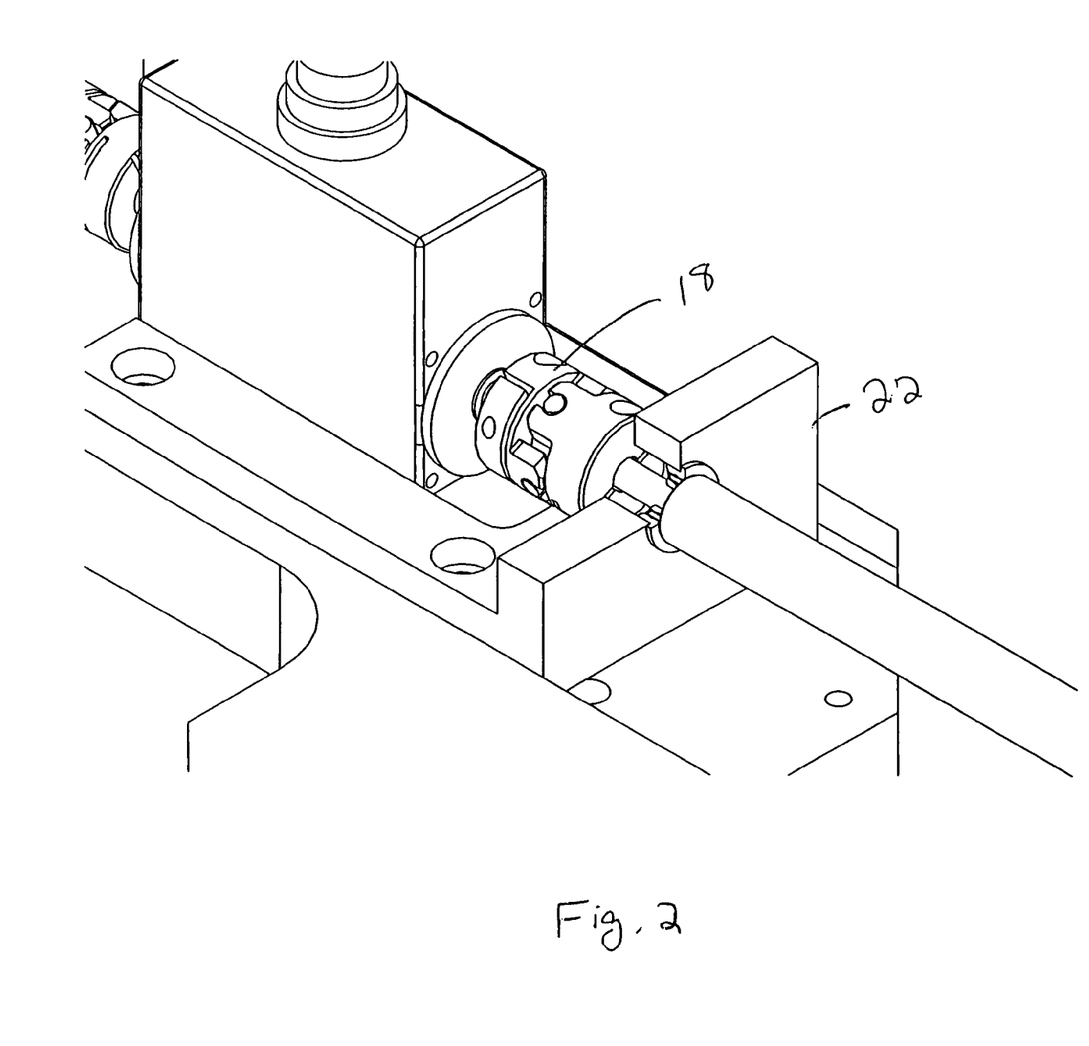
FIG. 3 is a graph depicting settling time of the stepper motor in the system if FIG. 1.

In operation, generally, the user of the system defines a travel path for the shaft or wheel and an angular step for that travel path. The travel path is the same in each of a loaded and unloaded state in the method as described. The system then automatically travels the paths defined in a clockwise and counter-clockwise direction, unloaded and loaded. Since the system has a certain settling time after each movement in a travel path, a delay exists between the automated movement and the acquisition of data. This settling time has been configured to be 2 seconds. It should be appreciated that other settling times may be appropriate. FIG. 3 shows the settling time of the measurement arm as captured using an oscilloscope. Once the system has been allowed to settle, five torque measurements are taken with a 100 ms time period between them. It should be appreciated that fewer or greater than 5 measurements could be taken and a time other than 100 ms could be used. The highest and lowest of the five samples are discarded and the average of the remaining three is taken and recorded as the torque at that angle. This multi-sampling approach is taken so that spikes caused by signal noise may be removed.

Figure 4:
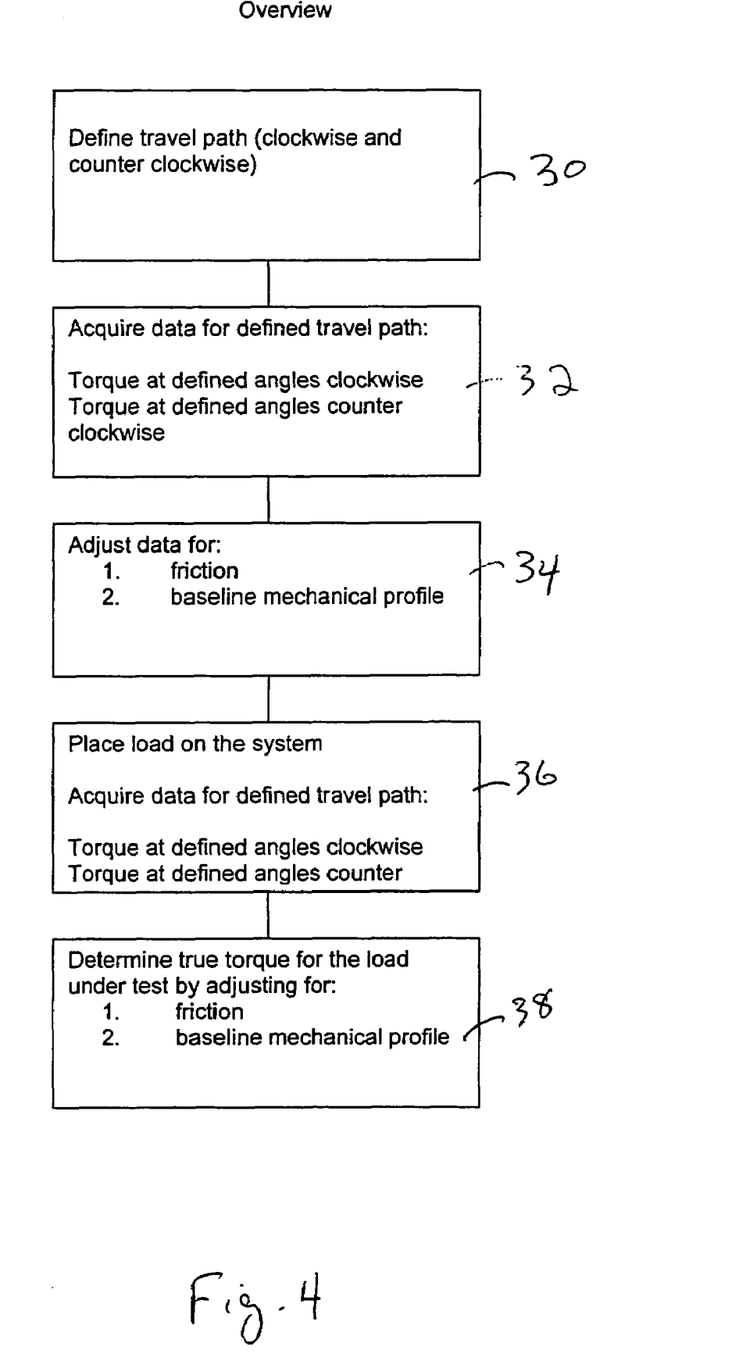
FIG. 4 is a block diagrammatic overview of the operation of the test system of FIG. 1.

As generally illustrated in FIG. 4 (overview), a true torque measurement of a rotary actuated shaft/wheel is determined in a process where first a travel path of the wheel is defined 30, in terms of a number of steps of the wheel through a defined angular path. It is desirable in measuring the true torque to decouple any axial or linear forces present from the rotary force in order to eliminate error that is introduced by the non-torque force(s). Thus, in application of the system described herein, an objective is to determine torque associated virtually exclusively by the load applied to the rotary actuated wheel while virtually eliminating the error or effects of friction and/or any baseline mechanical profile caused by characteristics of the system (e.g. tilt, asymmetry, noise, etc).

An unloaded data set is then acquired 32 with the system unloaded as the shaft/wheel is actuated through the defined travel path. As described, in this illustrative embodiment the actuation force is applied by the stepper motor 12 that is accurately controlled through a computer interface as is well known in the art. Torque data is measured at each angular step as the wheel is actuated in a first direction (e.g. clockwise). Torque data is then measured at each angular step as the wheel is actuated in the opposite direction (e.g. counter-clockwise). Thereafter, the first data set is adjusted 34, as described in more detail hereinafter, to virtually eliminate the effects of friction and the baseline mechanical profile of the system.

A load is then placed on the test system 36. The load may, for example, be a magnetic force applied by a fixed or electromagnet wherein it is desired to determine the torque on the shaft/wheel resulting from the application of the magnetic force or volume. With the load on the system, torque data is measured/acquired at each angular step as the wheel is actuated in a first direction (e.g. clockwise) through the defined travel path. Torque data is then measured at each angular step as the wheel is actuated in the opposite direction (e.g. counter-clockwise) through the defined travel path.

Ultimately, the true torque, i.e. torque less the effects of friction and the system baseline mechanical profile, is determined 38 as described in further detail hereinafter by adjusting measurement date to virtually eliminate these two effects. This is done so that the adjusted data represents the actual effects of the interaction of the load, e.g. magnetic field, and not changes in friction or the effect of the test system mechanical profile.

Two adjustments are made to the test system torque data. No adjustments are made to the angle data since the angle encoders are directly connected to the measurement wheels. The first adjustment to the torque measurement data is to remove the effects of friction. The friction will vary as a function of the load applied to the measurement wheel.

Figure 5:
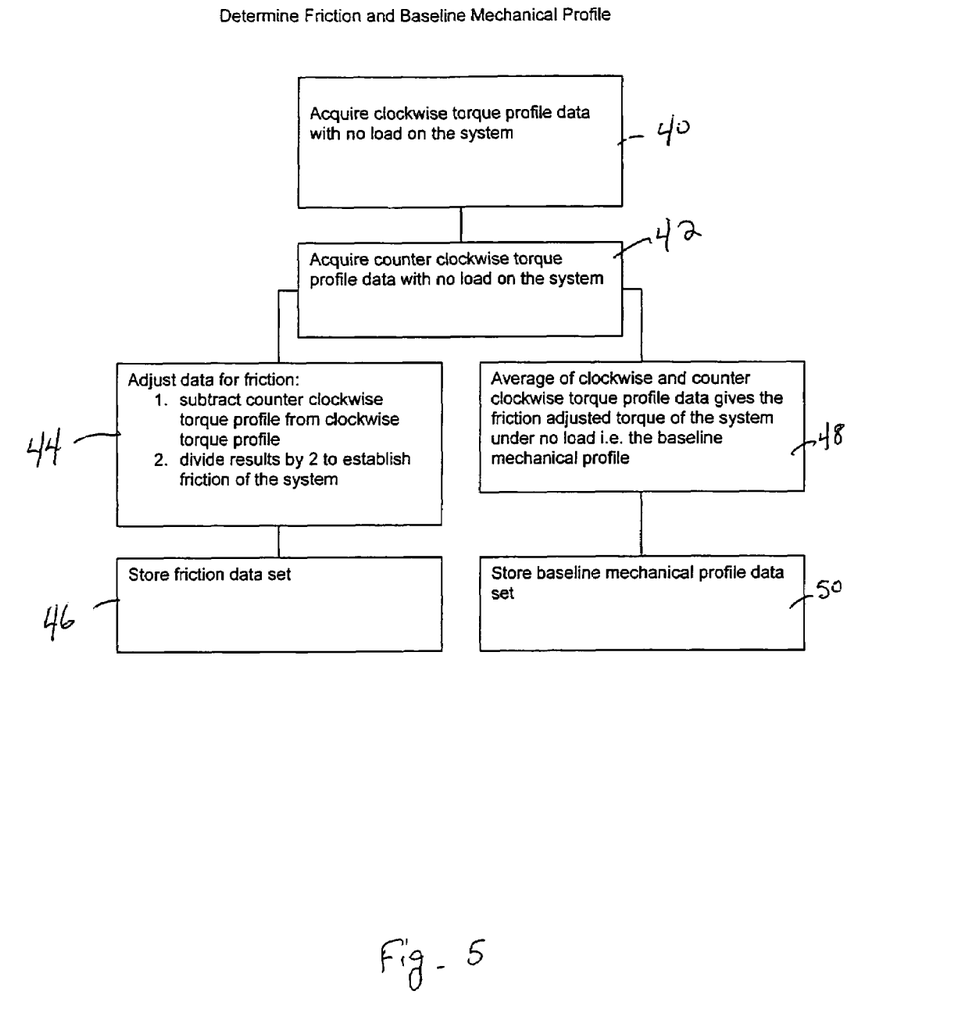
FIG. 5 is a block diagram of a process of determination of friction and system baseline mechanical profile, according to the invention.

Referring now to FIG. 5 (Determine Friction and Mechanical Baseline), in order to compensate for friction, a set of no-load torque profile data is acquired. Clockwise 40 and counter-clockwise 42 torque measurements are taken with no load on the system. Due to the way that the torque sensor works, the difference between these measurements represents two times the friction component sensed (the torque sensor is always measuring force in the same direction while the friction component will change direction depending on the direction of rotation). The no-load friction data set is then adjusted by subtracting 44 the counter clockwise torque profile from the clockwise torque profile and dividing by 2 to get a friction data set which provides a measurement of friction, i.e. a friction profile. The friction data can be stored 46 for use if and as needed. Then, taking the average of the clockwise and counter clockwise data sets 48 provides an average data set which is a friction compensated torque data set which can be stored 50 for use in performing adjustment of a torque data set taken under load as described hereinafter.

Figure 6A:
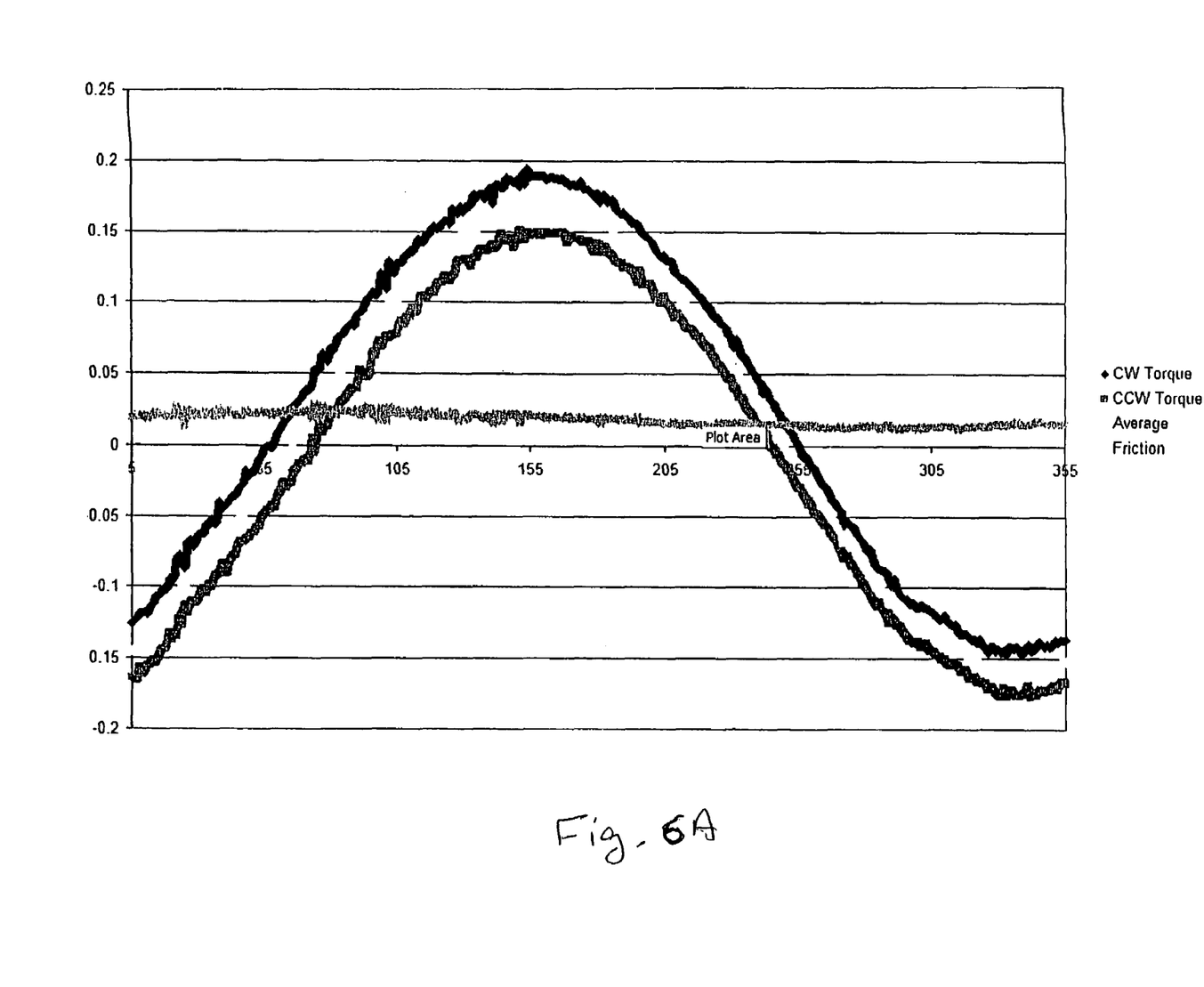
FIG. 6A and FIG. 6B are two graphs illustrating the clockwise and counter-clockwise torque readings for the test system measurement arm under different friction loads.
Figure 6B:
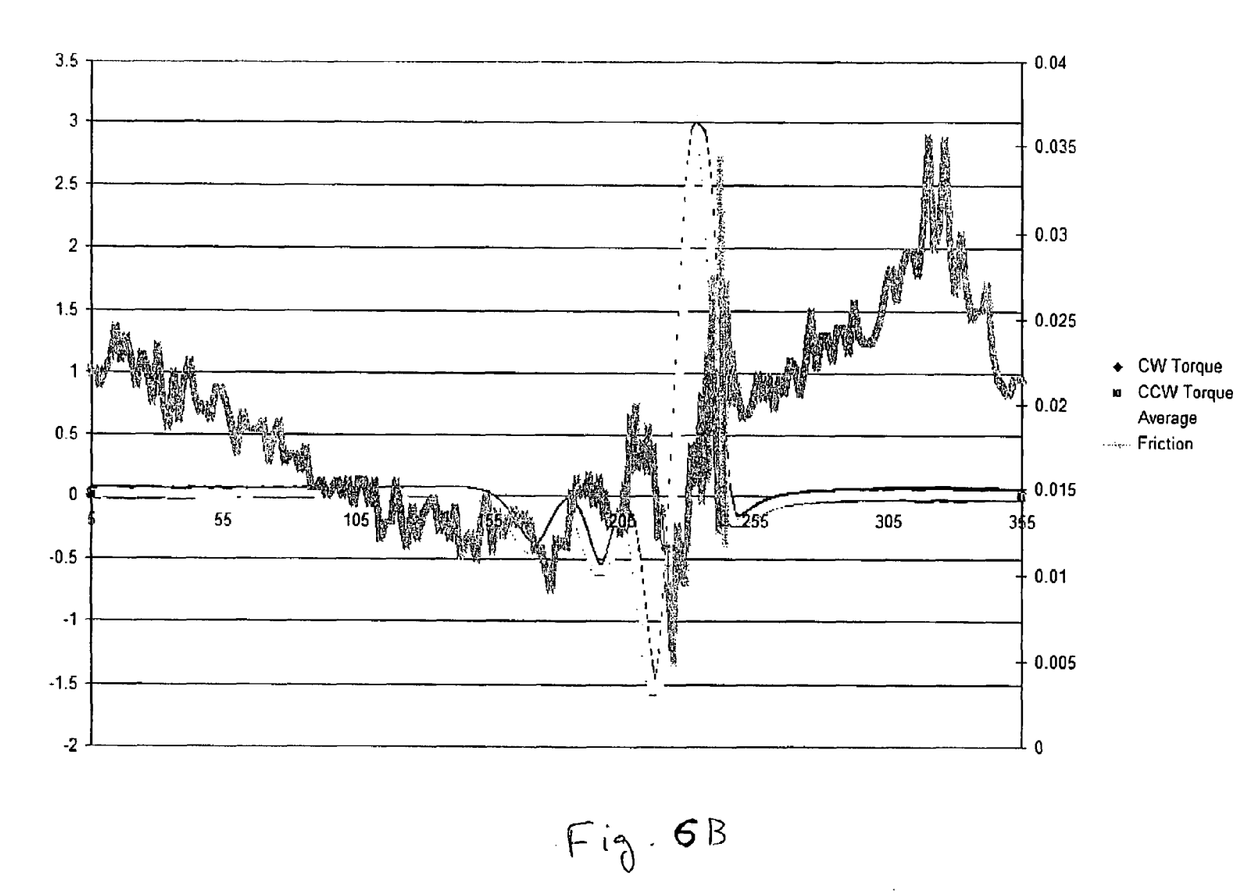

FIG. 6A and FIG. 6B are two graphs illustrating the clockwise and counter-clockwise torque readings for the test system measurement arm under different friction loads. The first graph, FIG. 6A, shows the measurement wheel under a constant friction load. The second graph, FIG. 6B, shows the same measurement arm under a varying friction load. The torque measurements of the system net of friction are hence the average of the clockwise and counter-clockwise torque measurements.

Figure 7:
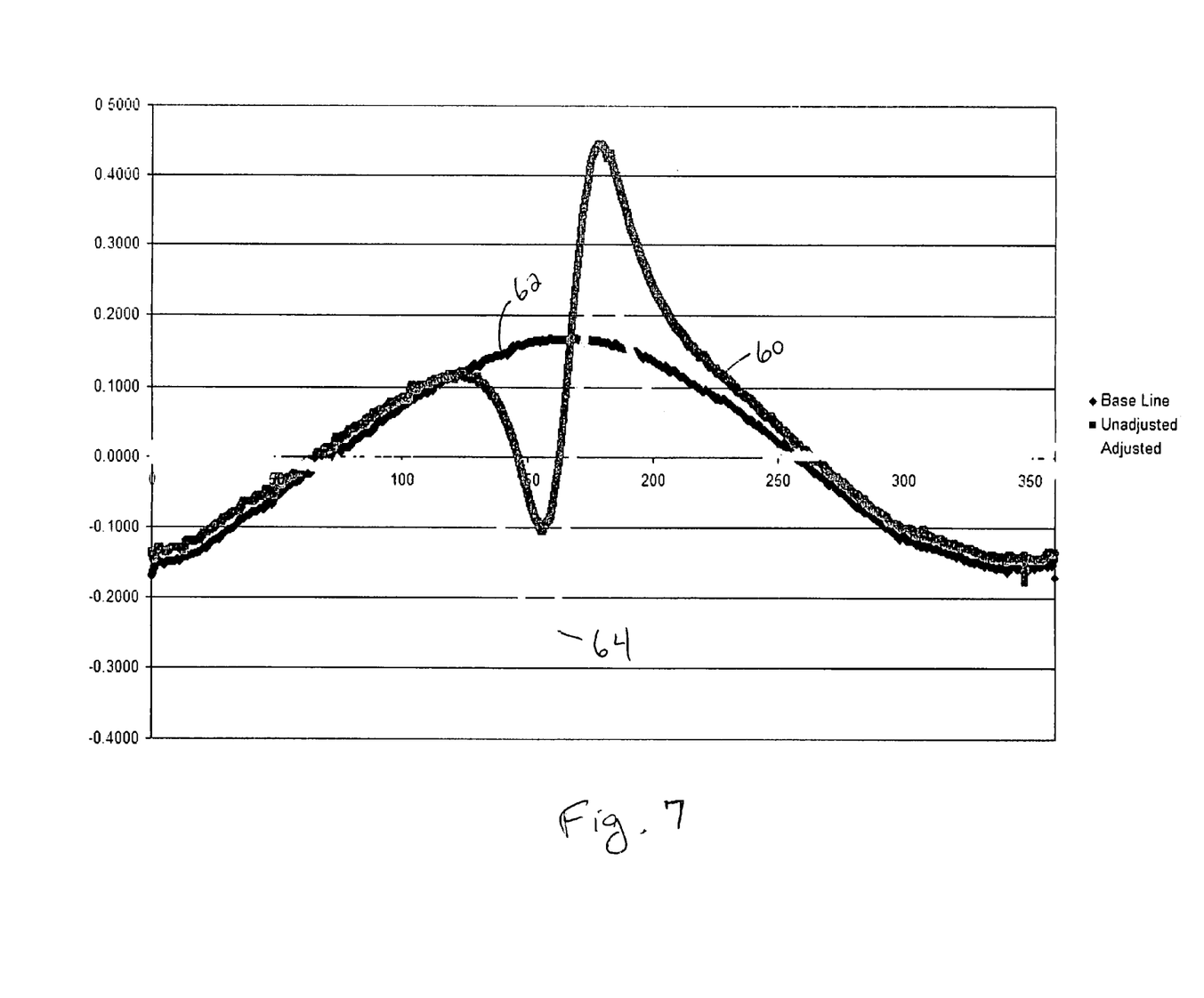
FIG. 7 is a graph showing an unadjusted torque, mechanical baseline profile and a torque curve adjusted to remove the mechanical baseline.

As with any mechanical system, the measurement system according to the invention has a certain mechanical profile that is captured by the torque sensor. Typically this is due to the fact that the system components, e.g. measurement arm, can not ever be perfectly aligned or balanced. As magnets or loads are added to the measurement arms the wheels become even more unbalanced. The base mechanical profile is hence typically a Sine curve, as illustrated in FIG. 7 which shows a graph of an unadjusted torque 60, a mechanical baseline profile 62 and a torque curve adjusted to remove the mechanical baseline 64.

Figure 8:
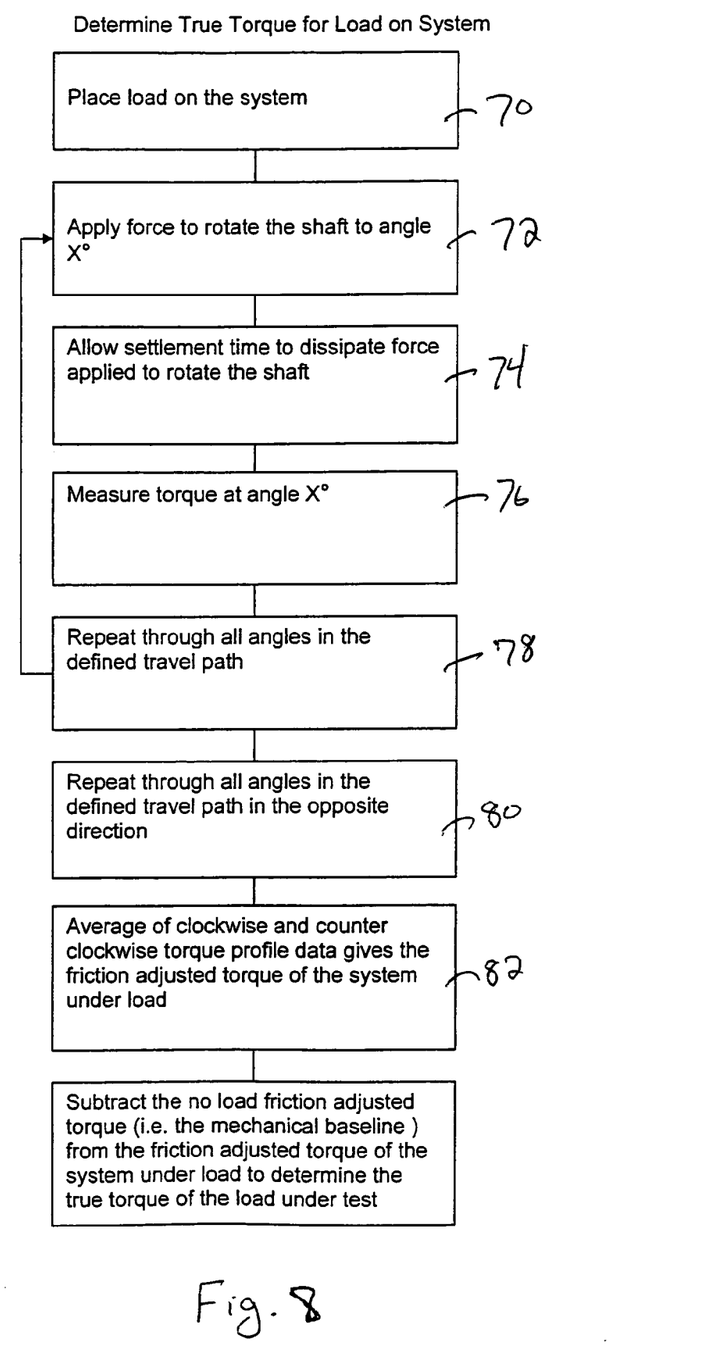
FIG. 8 is a block diagram of a process of determining true torque for load on a system, according to the invention.

Referring now to FIG. 8 (Determine True Torque for Load on System), in order to measure torque according to this embodiment of the invention, it is necessary to place a load on the system 70. Via the stepper motor, a force is applied to rotate the shaft in a first direction (e.g. clockwise), to a first angle 72, and allowed to settle 74. A torque measurement is taken at that angle 76. This is repeated for all angles in the defined travel path 78, in the first direction. Data is also gathered by performing the foregoing in the opposite direction 80, e.g. counter clockwise. The average of the clockwise and counter clockwise torque profile data gathered gives the friction adjusted torque profile of the system under load 82. The data set that was acquired in determining the friction and baseline mechanical profile of the system is used, i.e. including both the clockwise and counter-clockwise torque profile through the defined path. It is subtracted 84 from the friction adjusted profile (i.e. the no-load friction adjusted profile is subtracted from the loaded friction adjusted profile). This provides a representation of the true torque due to the load only. Accordingly, the torque is measured having substantially eliminated the friction and baseline mechanical profile of the system.

Figure 9:
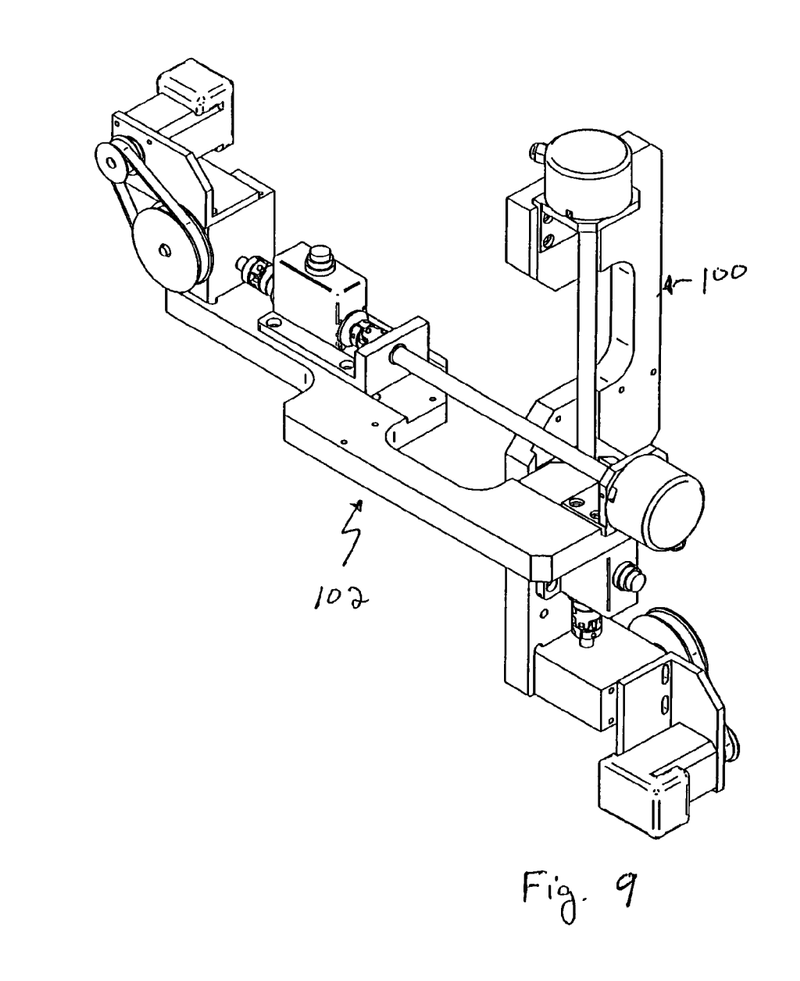
FIG. 9 is a view of an embodiment of a test system for measuring the inter-relationship of magnetic forces having two measurement arms according to the invention.
Figure 10:
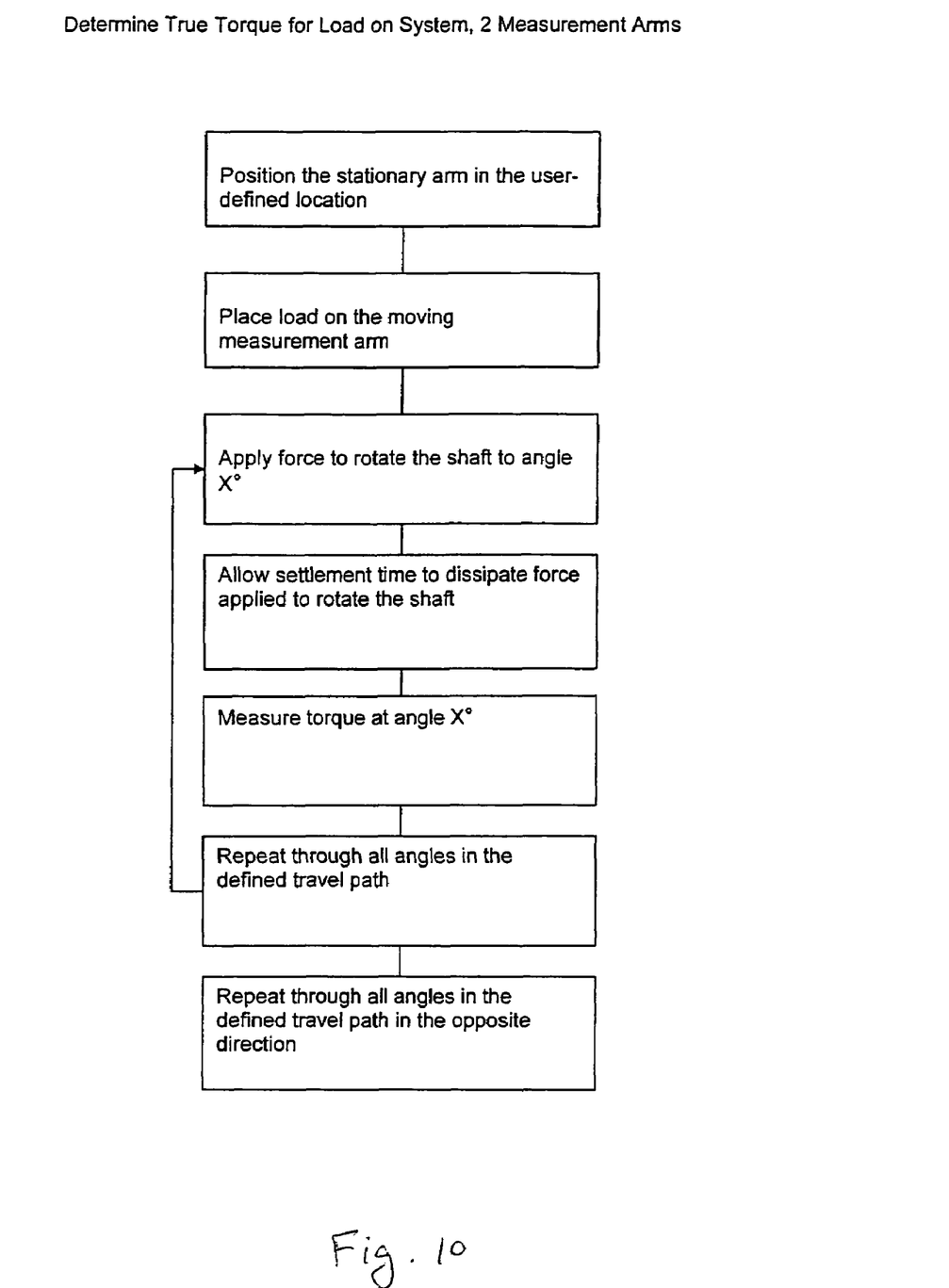
FIG. 10 is a block diagram of the operation of the test system embodiment of FIG. 9 comprising two measurement arms.

Referring now to FIG. 9, in order to measure the interaction of magnetic loads, it is necessary to construct a test system comprising two measurement arms 100, 102. The second arm is identical in components and construction to that already described hereinbefore with respect to FIG. 1. The second arm's baseline mechanical profile and friction profile are calculated using the method already described herein. The second arm is mounted adjacent to the first measurement arm, but at an angle of 90 degrees relative to the first measurement arm.

The position of the two measurement arms is such that with a load on each arm, for example a magnetic load, the interaction of the loads can be measured as follows: One load is positioned at a user-defined point and remains stationary for the duration of the test. A travel path and angular step are defined for the other load and data is then collected as it travels that path and interacts with the other load. Data adjustment is the same as already described herein, the result being the true torque profile for the travelling load based on its interaction with the stationary load. Any number of tests can be performed with either of the two arms in the stationary position and the load on the stationary arm in various user-defined positions.

It should be appreciated that the two measurement arms may be canted relative to one another at an angle other than 90 degrees. The distance between them may also vary.

Although a "wheel" is described in the embodiment herein, it should be appreciated that the test system according to the invention could be used to measure true load on other rotary actuated structures such as cams, bearings or the like, or on other geometrical forms of loaded structures.

While a stepper motor is shown and described as an actuator force, it should be appreciated that the wheel or loaded structure could be actuated by other forces such as manually or automatedly by other types of motors.

Although the invention has been shown and described with respect to illustrative embodiments thereof, it should be appreciated that the foregoing and various other changes, modifications, additions and deletions in the form and detail thereof may be made without departing from the spirit and scope of the invention as set for in the claims that follow.

What is claimed is:

1. A method for measuring load information, the method comprising the steps of:
defining a travel path for a shaft on which a load is disposed and defining an angular step for that travel path;
moving said shaft in said defined travel path in a clockwise and counter-clockwise direction;
acquiring a first torque data set as said shaft is actuated through the defined travel path with said shaft unloaded in a first direction and an opposite direction;
placing a load on said shaft;
with the load on said shaft, acquiring a second torque data set as said shaft is actuated in said first direction and said opposite direction; and
determining torque less effects of friction and system baseline mechanical profile by adjusting said second torque data set as a function of said first torque data set to virtually eliminate the effects of friction and system mechanical baseline.

2. The method of claim 1 wherein said shaft is moved in said defined travel path automatically.

3. The method of claim 1 further comprising the steps of defining a settling time after movement of said shaft comprising a delay between the movement of the shaft and the acquisition of data.

4. The method of claim 3 wherein said settling time is 2 seconds.

5. The method of claim 1 wherein said load is a magnetic load.

* * * * *